United States Patent
Xu (10) Patent No.: US 8,515,042 B2
(45) Date of Patent: Aug. 20, 2013

(54) METHOD FOR INDICATING CALL PROGRESS STATE, CONFERENCE CONTROL DEVICE, AND CONFERENCE SYSTEM

(75) Inventor: Fugang Xu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 378 days.

(21) Appl. No.: 12/950,772

(22) Filed: Nov. 19, 2010

(65) Prior Publication Data

US 2011/0064210 A1    Mar. 17, 2011

Related U.S. Application Data

(63) Continuation of application No. PCT/CN2009/071944, filed on May 25, 2009.

(30) Foreign Application Priority Data

Jun. 18, 2008  (CN) .......................... 2008 1 0126941

(51) Int. Cl.
 *H04M 3/42* (2006.01)
(52) U.S. Cl.
 USPC ....... 379/202.01; 370/261; 709/204; 709/227
(58) Field of Classification Search
 USPC .................. 379/202.01; 370/261; 709/204, 709/227
 See application file for complete search history.

(56) References Cited

U.S. PATENT DOCUMENTS

| | | |
|---|---|---|
| 2006/0147009 A1 | 7/2006 | Greenlee et al. |
| 2007/0130260 A1 | 6/2007 | Weintraub et al. |
| 2008/0069011 A1 | 3/2008 | Sekaran et al. |

FOREIGN PATENT DOCUMENTS

| | | |
|---|---|---|
| CN | 1738412 A | 2/2006 |
| CN | 1874547 A | 12/2006 |
| CN | 1878288 A | 12/2006 |
| CN | 1953537 A | 4/2007 |
| EP | 1 705 912 A1 | 9/2006 |
| EP | 1 890 500 A1 | 2/2008 |

OTHER PUBLICATIONS

International Search Report issued Sep. 3, 2009 in connection with International Patent Application No. PCT/CN2009/071944.
Office Action dated Dec. 6, 2011 in connection with Russian Patent Application No. 2010148790.
Written Opinion of the International Searching Authority dated Sep. 3, 2009 in connection with International Patent Application No. PCT/CN2009/071944.
Supplementary European Search Report dated Mar. 3, 2011 in connection with European Patent Application No. 09 76 5359.
Notification on the results of patentability check dated Feb. 10, 2012 in connection with Russian Patent Application No. 2010148790/07(070448).
Partial Translation of Office Action dated Jun. 15, 2012 in connection with Chinese Patent Application No. 200810126941.4.

(Continued)

*Primary Examiner* — Quynh Nguyen (57) ABSTRACT

A method, equipment, and conference system for a call progress state are provided. The adopted scheme includes: after a call request is sent to a called terminal, multimedia indication information of a call progress state is obtained. The multimedia indication information of the call progress state is sent to a management station of conference control device and/or a conference terminal, so that the management station of conference control device and/or the conference terminal output a corresponding multimedia indication of a progress state according to the multimedia indicating output information of the call progress state.

9 Claims, 4 Drawing Sheets

(56) References Cited

OTHER PUBLICATIONS

Partial Translation of Office Action dated Jun. 2, 2011 in connection with Chinese Patent Application No. 2008101269414.

Communication pursuant to Article 94(3) EPC dated Oct. 7, 2011 in connection with European Patent Application No. 09 765 359.6.
Office Action dated Aug. 24, 2011 in connection with Russian Patent Application No. 2010148790.
Partial Translation of Rejection Descision dated Dec. 5, 2012 in connection with Chinese Patent Application No. 200810126941.4.

METHOD FOR INDICATING CALL PROGRESS STATE, CONFERENCE CONTROL DEVICE, AND CONFERENCE SYSTEM

CROSS-REFERENCE TO RELATED APPLICATIONS

The application is a continuation of International Application No. PCT/CN2009/071944, filed on May 25, 2009, which claims priority to Chinese Patent Application No. 200810126941.4, filed on Jun. 18, 2008, both of which are hereby incorporated by reference in their entireties.

TECHNICAL FIELD

The present invention relates to the field of communications technology, and more particularly to a method for indicating a call progress state, conference control device, and a conference system.

BACKGROUND

Figure 1:
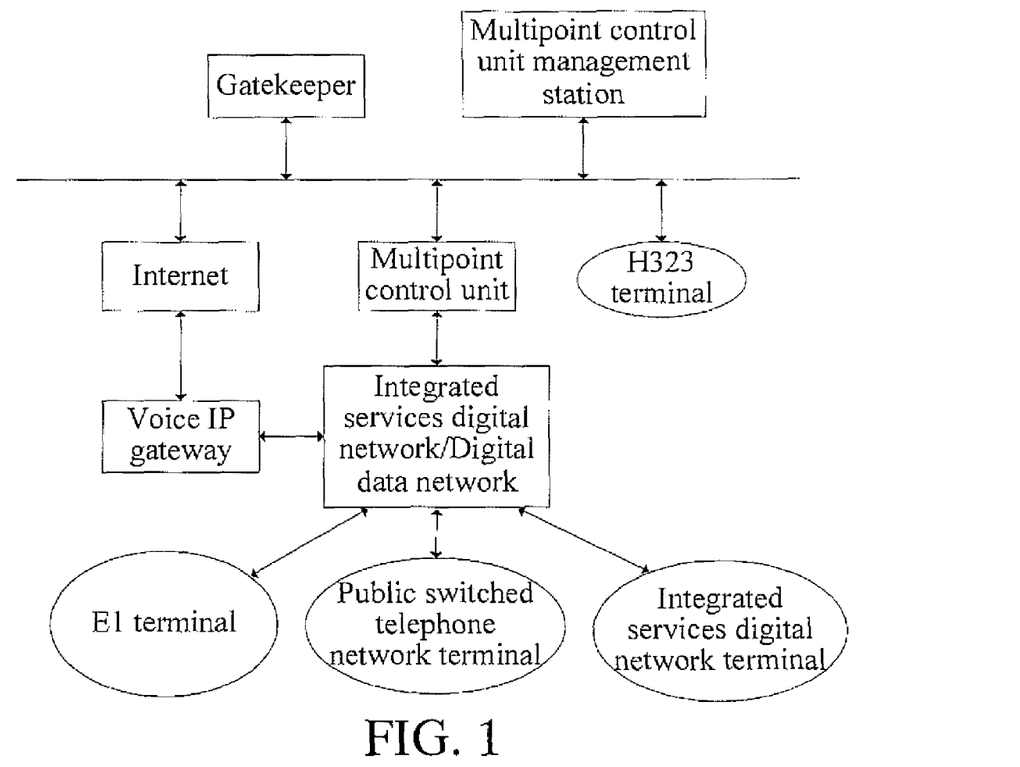
FIG. 1 is a schematic diagram of a multipoint conference system in the prior art.

With the development of communications technology, multipoint conference systems are now being broadly used. Through the multipoint conference system, a conference with several sites at the same time can be held. Referring to FIG. 1, a multipoint conference system usually includes a multipoint control unit (MCU), an MCU management station, and several terminals. The terminals include common conference participation terminals and chairman terminals designated from the conference participation terminals. The multipoint conference system can support the access of a circuit switched network and a packet switched network. The terminals that access to the conference may be H.323 terminals, E1 terminals, Integrated Services Digital Network (ISDN) terminals, Public Switched Telephone Network (PSTN) terminals, and so on.

In a multipoint conference, when calling a called terminal fails, a manager or a call initiator of the multipoint conference is usually indicated with a reason why the call failed. A method for indicating call failure in prior art includes the following blocks:

(1) An MCU sends a call request including called terminal information to a switch of a called terminal.

(2) The switch calls the called terminal according to the call request.

(3) If the call fails, the switch determines the reason of the call failure, and returns identification information of the call failure reason to the MCU.

(4) The MCU sends the identification information of the call failure reason to an MCU management station or a chairman terminal. According to a mapping relationship between the preset identification information and voice information of the call failure reason, the MCU management station or the chairman terminal obtains the voice information of the call failure reason corresponding to the identification information, and then plays the voice information.

In the implementation of the present invention, the inventors found that the prior art at least has the following problems: To indicating the manager or the call initiator of the multipoint conference with the call failure reason through a voice, the call failure reason should be recorded and stored in advance on the MCU management station or on the terminals serving as the chairman terminals, which is cumbersome and occupies too many storage resources.

SUMMARY

The embodiments of the present invention provide a method for indicating multimedia indication of a call process state in a conference system, a conference control device and a conference system, so as to solve the problems in the prior art that the implementation is cumbersome and the occupied storage resources are large because a call failure reason voice is recorded and stored in advance at an MCU management station or terminals serving as chairman terminals.

To address the above technical problems, the embodiments of the present invention provide the following technical solutions.

A method for indicating a call progress state in a conference system is provided. The method includes the following blocks:

After a call request to a called terminal is sent, multimedia indication information of a call progress state corresponding to the call request is obtained.

The multimedia indication information of the call progress state is sent to a management station of conference control device and/or a conference terminal.

A conference control device is provided. The equipment includes a call request sending unit, a receiving unit, and a multimedia indication information outputting unit.

The call request sending unit is configured to send a call request to a called terminal.

The receiving unit is configured to receive multimedia indication information of a call progress state.

The multimedia indication information outputting unit is configured to send the multimedia indication information of the call progress state to a management station of conference control device and/or a conference terminal.

A conference system realizing the indication of a call progress state is provided. The system includes conference control device and at least one terminal.

The conference control device is configured to obtain multimedia indication information of a call progress state corresponding to a call request after the call request is sent, and to send the multimedia indication information of the call progress state.

The at least one terminal is configured to receive the call request, and to output a corresponding multimedia indication of a progress state according to the multimedia indication information of the call progress state sent by the conference control device.

As can be seen from the above technical solutions, in the embodiments of the present invention, multimedia indication information of a call progress state is obtained through conference control device, and is sent to a management station of conference control device and/or a conference terminal. Therefore, compared with the prior art in which the received identification information is converted into voice information of a call failure reason through a management station of conference control device and a conference terminal, the present invention achieves the following: The storage resources of the management station of conference control device and the conference terminal are saved because both the management station of conference control device and the conference terminal are not used to store the indication information resources according to the embodiments of the present invention. The present invention adopts various indicating modes, and made richer indication information.

DETAILED DESCRIPTION

The embodiments of a method for indicating a call progress state in a conference system, a conference control device, a conference device, and a conference system provided in the present invention are described in detail with reference to the accompanying drawings.

Figure 2:
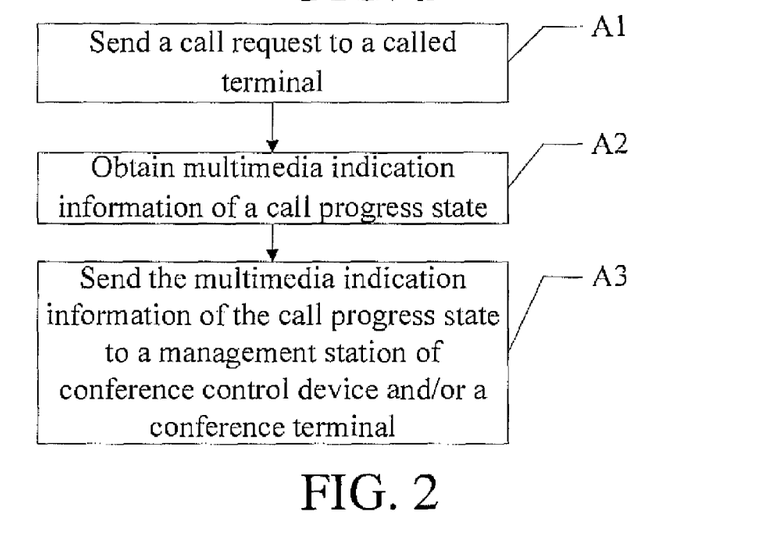
FIG. 2 is a flow chart of a first method embodiment for realizing a multimedia indication of a call progress state according to the present invention.

The first method embodiment for indicating a call progress state in a conference system is provided in an embodiment of the present invention, which describes a basic process of the method for indicating a call progress state in the conference system of the present invention. Referring to FIG. 2, the embodiment of the method includes the following blocks:

In block A1, send a call request to a called terminal.

The called terminal may be an H323 terminal, an E1 terminal, an ISDN terminal, and a PSTN terminal.

In block A2, obtain multimedia indication information of a call progress state.

The call progress state may include one or more of the following states: call connecting, call failed, and call successful. The multimedia indication information of the call progress state may include one or more of the following information: text, voice, video, and picture.

The multimedia indication information of the call progress state may be generated by the called terminal or a management station of conference control device.

In block A3, send the multimedia indication information of the call progress state to a management station of conference control device and/or a conference terminal.

When the multimedia indication information of the call progress state is sent to the management station of conference control device and/or the conference terminal, the multimedia indication information of the call progress state may be transmitted either in a single channel or in different channels together with other conference information. The multimedia indication information of the call progress state may be mixed with the conference information and sent to the management station of conference control device and/or the conference terminal. The other conference information includes control command information and conference voice or video data information.

The call progress state includes one or more of the following states: call connecting, call failed, and call successful. The multimedia indication information of the call progress state includes one or more of the following information: text, voice, video, and picture.

Before the multimedia indication information of the call progress state is sent to the management station of conference control device and/or the conference terminal, if it is determined that the multimedia indication information of the call progress state needs to be mixed with other conference information, the multimedia indication information of the call progress state is mixed with the other conference information. As for the mixing process of the multimedia indication information of the call progress state and the conference information, processes for different multimedia information are different. For example, voice indication information may be mixed with conference voice data and then sent to the management station of conference control device and/or the conference terminal; picture or video indication information of a call progress state may be mixed with the conference information in a Picture-in-Picture mode; and text indication information of a call progress state may be superposed on conference assistant stream information and then sent to the management station of conference control device and/or the conference terminal, or by using the method of caption superposition.

In the embodiment of the present invention, the call process is completed via signaling interaction, such that the conference control device is able to distinguish whether the call is successful or failed according to the multimedia indication information of the call progress state and thus controls output modes of the indication information of the call progress state. Therefore, compared with the prior art in which the received identification information is converted into call failure reason voice information through a management station of conference control device and a conference terminal, the present invention achieves the following: the storage resources of the management station of conference control device and the conference terminal are saved because both the management station of conference control device and the conference terminal are not used to store the indication information resources according to the embodiments of the present invention. The present invention adopts various indicating modes, and enables the indication information to be more abundant.

Figure 3:
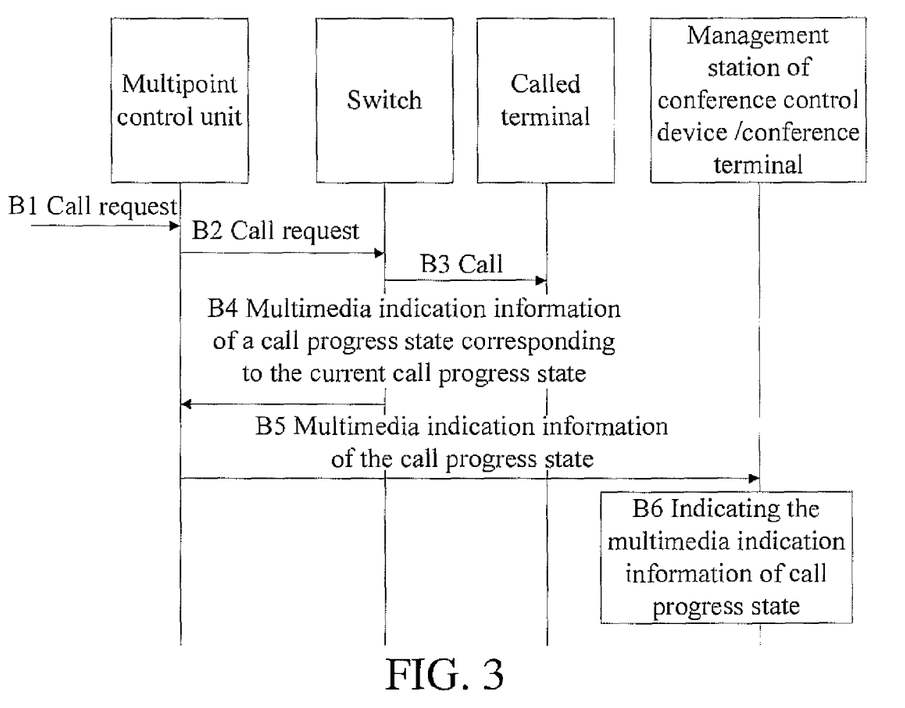
FIG. 3 is a flow chart of a second method embodiment for realizing a multimedia indication of a call progress state according to the present invention.

A second method embodiment for realizing multimedia indication of a call progress state in a conference system is provided in the present invention, referring to FIG. 3, the method includes the following blocks:

In block B1, an MCU receives a call request including called terminal information.

The call request may be sent by a chairman terminal or an MCU management station.

In block B2, send a call request to a switch of the called terminal.

In block B3, the switch calls the called terminal according to the call request.

In block B4, according to the current call progress state, the switch returns to the MCU multimedia indication information of the call progress state corresponding to the current call progress state.

The call progress state may include one or more of the following states: call connecting, call failed, and call successful.

The multimedia indication information of the call progress state may include one or more of the following information: text, voice, video, and picture.

Furthermore, various reasons may be responsible for a failure when the switch calls a called terminal, for example, engaged called terminal or line failure. After determining the call failure reason, the switch can obtain indication information of the call failure state corresponding to the determined call failure reasons according to the mapping relationship between the preset call failure reason in the switch and the voice indication information of the call failure reason, and return the indication information of the call failure state to the MCU.

In block B5, the MCU receives the multimedia indication information of the call progress state returned by the switch when the called terminal is called, and sends the information to a management station of conference control device and/or a conference terminal.

Before the multimedia indication information of the call progress state is sent to the management station of conference control device and/or the conference terminal, if it is determined that the multimedia indication information of the call progress state needs to be mixed with other conference information, the multimedia indication information of the call progress state is mixed with the other conference information. As for the mixing process of the multimedia indication information of the call progress state and the conference information, processes for different multimedia information are different. For example, voice indication information may be mixed with conference voice data and then sent to the management station of conference control device and/or the conference terminal; picture or video indication information of a call progress state is mixed with conference information may be mixed with the conference information in a Picture-in-Picture mode; and text indication information of a call progress state may be superposed on conference assistant stream information and then sent to the management station of conference control device and/or the conference terminal, or by using the method of caption superposition.

In block B6, the management station of conference control device and/or the conference terminal receive and indicates the multimedia indication information of the call progress state.

Thus, a multimedia indication of a call progress state has been realized. Furthermore, to ensure the continuity of the conference, the MCU, the management station of conference control device and/or the conference terminal also need to periodically detect whether multimedia indication information of a call progress state is further received. If no information is received for a while, the state of the last time is restored.

In the embodiment of the present invention, before sending multimedia indication information of a call progress state to the management station of conference control device and/or the conference terminal, the MCU also can mix the multimedia indication information of the call progress state with the conference information and send it to the management station of conference control device and/or the conference terminal. In the third embodiment for realizing multimedia indication of a call progress state in the present invention, description is made by taking the multimedia indication information of the call progress state in a voice mode as an example, and the method of the embodiment includes the following blocks:

In block C1, an MCU receives a call request including called terminal information.

The call request may be sent by a chairman terminal or an MCU management station.

In block C2, update a mix table of the chairman terminal, and the called terminal information is added to the mix table.

In block C3, the MCU sends a call request to a switch of the called terminal.

In block C4, the switch calls the called terminal according to the call request.

In block C5, according to the current call progress state, the switch returns voice indication information of a call progress state corresponding to the current call progress state to the MCU.

In this embodiment, the voice indication information of the call progress state may be generated by the switch.

The call progress state may include one or more of the following states: call connecting, call failed, and call successful.

When the voice indication information of the call progress state is sent to the management station of conference control device and/or the conference terminal, the multimedia indication information of the call progress state may be transmitted either in a single channel or in different channels together with other conference information.

Furthermore, when the call progress state is call failed, after obtaining call failure reasons, the switch can obtain voice indication information corresponding to the determined call failure reasons according to the mapping relationship between the preset call failure reasons in the switch and the voice indication information of the call failure reason, and returns the voice indication information to the MCU.

In block C6, the MCU receives the voice indication information of the call progress state returned by the switch when the called terminal is called, and it is determined whether to perform a mixing process on the voice indication information of the call progress state. If yes, the voice indication information of the call progress state is mixed with voice information of the original conference and then sent to the management station of conference control device and/or the conference terminal, and then block C7 is performed; otherwise, no mixing process is performed, and the flow is completed.

In the embodiment of the present invention, the mixing process mainly refers to that when the MCU receives too much voice code streams sent by conference participation terminals at the same period, to ensure the conference quality, the MCU synthesizes several voices into one signal, and provides the signal to the conference terminals to be played. The strategy may be, for example, choosing several voices with greatest sound according to the sound.

The determining whether to perform the mixing process on the voice indication information of call failure reason corresponding to the called terminal may be realized by determining whether the mix table of the chairman terminal includes the called terminal information. If yes, mixing process is performed for the voice indication information of call failure reason corresponding to the called terminal; otherwise, the mixing process is not performed.

In block C7, the management station of conference control device and/or the conference terminal receive and play the voice indication information.

In this embodiment, the called terminal information may be identification of the called terminal, the conference terminal may be a chairman terminal and/or other conference participation terminals, and specifically, the conference control device is an MCU.

In the embodiment of the present invention, the voice indication information of the call failure reason is directly recorded at the switch. When the call fails, the switch directly returns corresponding voice indication information of a call failure reason to the MCU, and then the MCU provides it to the management station of conference control device or the conference terminals. Compared with the method in the prior art in which voice indication information is recorded at the MCU or at the terminals serving as chairman terminals, this method is simple and occupies few storage resources.

In the fourth method embodiment for realizing multimedia indication of a call progress state in a conference system according to an embodiment of the present invention, voice indication information of a call progress state is in a text mode, and the method of the embodiment includes the following blocks:

In block D1, an MCU receives a call request including called terminal information.

The call request may be sent by a chairman terminal or an MCU management station.

In block D2, the MCU sends a call request to a switch of the called terminal.

In block D3, the switch calls the called terminal according to the call request.

In block D4, according to the current call progress state, the switch returns text indication information of a call progress state corresponding to the current call progress state to the MCU.

In this embodiment, the text indication information of the call progress state may be generated by the called terminal or a communication network of the called terminal. The call progress state may include one or more of the following states: call connecting, call failed, and call successful.

In block D5, the MCU receives the text indicates information of the call progress state returned by the switch when the called terminal is called, and it is determined whether to perform a mixing process on the text indication information of the call progress state. If yes, the text indication information of the call progress state is mixed with other conference information and sent to the management station of conference control device and/or the chairman terminal, and then block C7 is performed; otherwise, the text indication information is transmitted to the management station of conference control device or the chairman terminal.

In block D6, the management station of conference control device or the chairman terminal mixes the text indication information of the call progress state with other conference information.

Herein, the other conference information includes control command information and conference data information.

In block D7, the management station of conference control device or the chairman terminal receives and indicates the user with the text indication information of the call progress state after the mixing process.

In this embodiment, the mixing the text indication information of the call progress state with other conference information may be realized by directly superposing the text indication information of call progress state on conference pictures.

In the fifth method embodiment for realizing multimedia indication of a call progress state in a conference system of the present invention, the multimedia indication information of the call progress state is in a video mode, and the method of the embodiment includes the following blocks:

In block E1, an MCU receives a call request including called terminal information.

The call request may be sent by a chairman terminal or an MCU management station.

In block E2, the MCU sends a call request to a switch of the called terminal.

In block E3, the switch calls the called terminal according to the call request.

In block E4, according to the current call progress state, the switch returns video indication information of a call progress state corresponding to the current call progress state to the MCU.

In this embodiment, the video indication information of the call progress state may be generated by a called terminal or a management station of conference control device. The call progress state may include one or more of the following states: call connecting, call failed, and call successful.

In block E5, the MCU receives the video indication information of call progress state returned by the switch when the called terminal is called, and directly sends the video indication information instead of the videos of the original conference of the management station of conference control device or the chairman terminal.

In block E6, the management station of conference control device or the chairman terminal receives and plays a video stream sent by the MCU.

In more embodiments of the present invention, when the multimedia indication information of the call progress state is in a video mode, and if both the MCU and the management station of conference control device or the chairman terminal support multi-stream mode, the MCU can also transmit the received video indication information of the call progress state in other video channels. After receiving the video indication information in the corresponding channel, the management station of conference control device or the chairman terminal plays the video indication information instead of the video stream of the original conference.

In more embodiments of the present invention, when the multimedia indication information of the call progress state is in a picture mode, a process similar to the one in video mode can be performed, which is not repeated herein.

Figure 4:
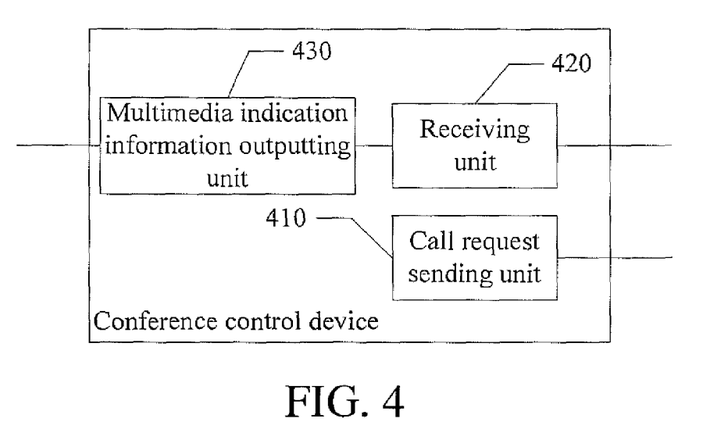
FIG. 4 is a schematic diagram of Embodiment 1 of conference control device according to the present invention.

Referring to FIG. 4, Embodiment 1 of conference control device according to the present invention includes a call request sending unit 410, a receiving unit 420, and a multimedia indication information outputting unit 430.

The call request sending unit 410 is configured to send a call request to the called terminal.

The receiving unit 420 is configured to receive multimedia indication information of a call progress state.

The multimedia indication information outputting unit 430 is configured to send the received multimedia indication information of the call progress state to a management station of conference control device and/or a conference terminal.

Specifically, the conference control device is an MCU.

Figure 5:
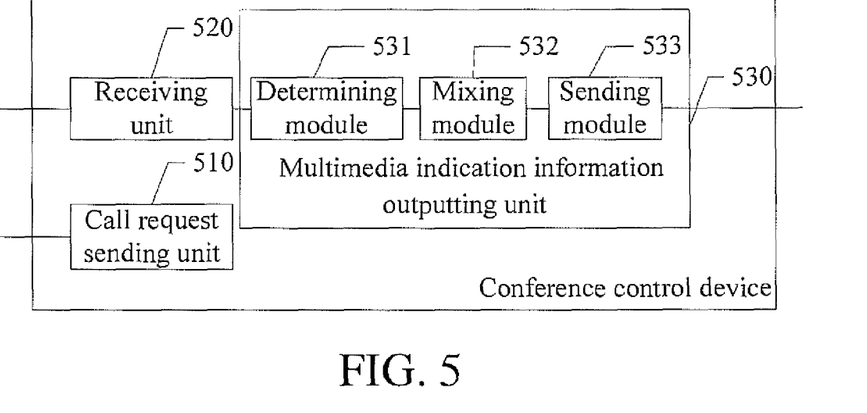
FIG. 5 is a schematic diagram of Embodiment 2 of conference control device according to the present invention.

Referring to FIG. 5, Embodiment 2 of conference control device according to the present invention includes a call request sending unit 510, a receiving unit 520, and a multimedia indication information outputting unit 530. The multimedia indication information outputting unit 530 includes a determining module 531, a mixing module 532, and a sending module 533. The call request sending unit 510 is configured to send a call request to the called terminal. The receiving unit 520 is configured to receive multimedia indication information of a call progress state. The determining module 531 is configured to determine whether to perform a mixing process on the multimedia indication information of the call progress state. The mixing module 532 is configured to mix the multimedia indication information of the call progress state with other conference information when the result of the determination is yes. The sending module 533 is configured to send the information after the mixing process to a management station of conference control device and/or a conference terminal. The other conference information includes control command information and conference data information. The multimedia indication information outputting unit is 530 is configured to send the multimedia indication information to the management station of conference control device and/or the conference terminal.

In the embodiments of the conference control device, the multimedia indication information of a call progress state includes one or more of the following information: text, voice, video, and picture. The call progress state includes one or more of the following states: the connecting, call failed, and call successful. The conference control device may be an MCU.

Figure 6:
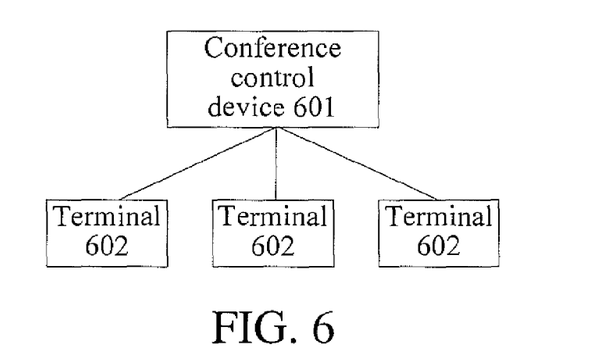
FIG. 6 is a schematic diagram of a conference system for realizing indication of a call progress state according to an embodiment of the present invention.

FIG. 6 is a schematic diagram of a conference system for realizing indicating a call progress state according to the present invention.

A conference control device 601 is configured to send a call request, obtain multimedia indication information of a call progress state, and send the multimedia indication information of the call progress state.

If it is determined that a mixing process is required for the multimedia indication information of the call progress state, the multimedia indication information of the call progress state is mixed with other information of the conference.

A terminal 602 is configured to receive the call request, and output a corresponding multimedia indication of a progress state according to the multimedia indication information of the call progress state sent by the conference control device.

The terminal 602 may be several terminals, and the conference control device 601 calls one or more designated terminals.

The conference control device 601 may send the multimedia indication information of the call progress state to either the management station of conference control device or the conference terminal, or to both the management station of conference control device and/or the conference terminal.

Figure 7:
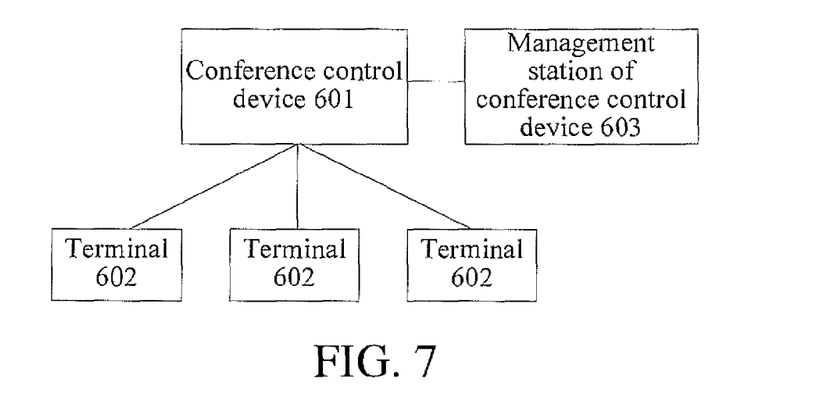
FIG. 7 is a schematic diagram of a conference system for realizing indication of a call progress state according to another embodiment of the present invention.

Referring to FIG. 7, the conference system for indicating a call progress state further includes a management station of conference control device 603, which is configured to output a corresponding multimedia indication of a progress state according to the multimedia indication information of the call progress state sent by the conference control device. The other description is the same with the one in FIG. 6, and is not repeated herein.

Figure 8:
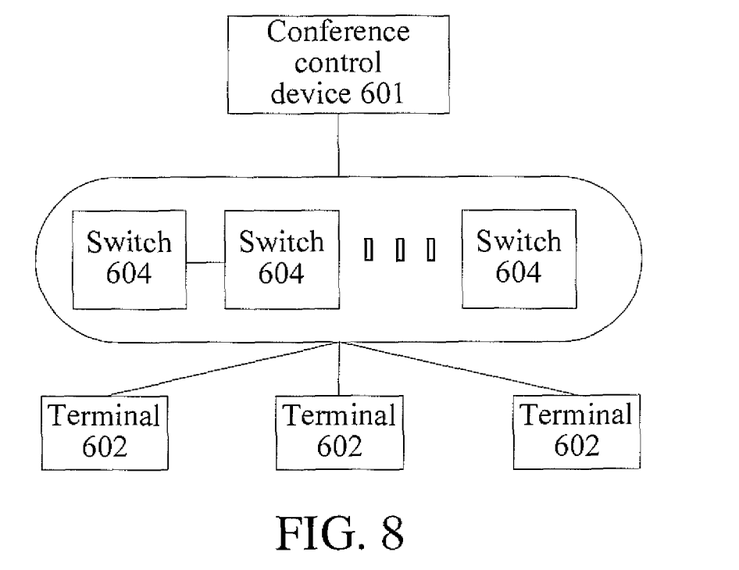
FIG. 8 is a schematic diagram of a conference system for realizing indication of a call progress state according to still another embodiment of the present invention.

Referring to FIG. 8, based on the embodiment in FIG. 6, the conference system for indicating a call progress state may further include at least one switch 604 forming a bearer network of the conference system, which is configured to generate multimedia indication information of a call progress state, and send the multimedia indication information of the call progress state to the conference control device 601. Then the conference control device 601 sends the multimedia indication information of the call progress state to the terminal 602. The functions of other equipment are the same as those in the embodiment in FIG. 6, and are not repeated herein.

Figure 9:
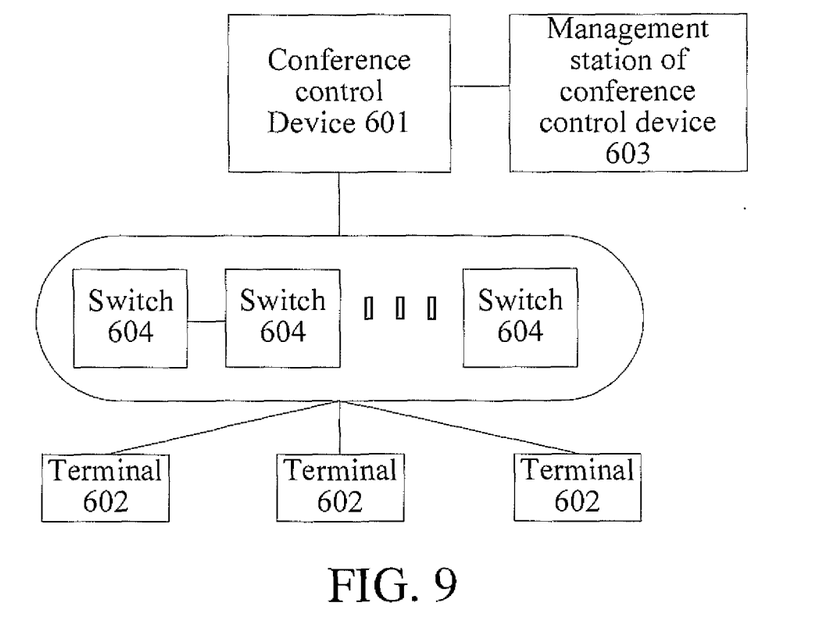
FIG. 9 is a schematic diagram of a conference system for realizing indication of a call progress state according to another embodiment of the present invention.

Referring to FIG. 9, based on the embodiment in FIG. 7, the conference system for indicating a call progress state may further include at least one switch 604 forming a bearer network of the conference system, which is configured to generate multimedia indication information of a call progress state, and send the multimedia indication information of the call progress state to the conference control device 601. Then the conference control device 601 sends the multimedia indication information of the call progress state to the management station of conference control device 603 and the terminal 602.

In the embodiment of the present invention, the call process is completed via signaling interaction, so that the conference control device can distinguish whether the call is successful or failed according to the multimedia indication information of the call progress state and thus control output modes of the indication information of the call progress state. Therefore, compared with the prior art in which the received identification information is converted into voice information of a call failure reason through a management station of conference control device and a conference terminal, the present invention achieves the following: the storage resources of the management station of conference control device and the conference terminal are saved because both the management station of conference control device and the conference terminal are not used to store the indication information resources according to the embodiments of the present invention. The present invention adopts various indicating modes, and enables the indication information to be more abundant.

The method for realizing multimedia indication of a call progress state in a conference system and the conference control device provided in the embodiments of the present invention are described in detail above. Specific instances are adopted to describe principles and implementation manners of the present invention. The description of the above embodiments is used only for understanding the method and ideals of the present invention. Person having ordinary skill in the art can make variations and modifications to the present invention in terms of the specific implementations and application scopes according to the ideas of the present invention. Therefore, the specification shall not be construed as limitations to the present invention.

What is claimed is:

1. A method for indicating a call progress state in a conference system, the method comprising:
   obtaining multimedia indication information of a call progress state corresponding to a call request after sending the call request to a called terminal; and
   sending the multimedia indication information of the call progress state to at least one of: a management station of conference control device or a conference terminal;
   wherein sending the multimedia indication information of the call progress state comprises:
   mixing the multimedia indication information of the call progress state with other conference information to form mixed information,
   wherein mixing the multimedia indication information of the call progress state with other conference information further comprises at least one of: mixing voice indication information of the call progress state with conference voice data or mixing picture or video indication information of the call progress state with conference video information in a Picture-in-Picture mode; and
   sending the mixed information to at least one of: the management station of conference control device or the conference terminal.

2. The method according to claim 1, wherein obtaining the multimedia indication information of the call progress state comprises:
   obtaining the multimedia indication information of the call progress state from the called terminal or a bearer network switch of the conference system.

3. The method according to claim 1, wherein the call progress state represented by the multimedia indication information of the call progress state comprises one or more of the following states:
   call connecting, call failed, and call successful.

4. The method according to claim 1, wherein the conference terminal comprises:
   other terminals, other conference participation terminals, and the called terminal.

5. A conference control device, comprising:

a call request sending unit, configured to send a call request to a called terminal;

a receiving unit, configured to receive multimedia indication information of a call progress state; and a multimedia indication information outputting unit, configured to send the multimedia indication information of the call progress state to at least one of: a management station of conference control device or a conference terminal;

wherein the multimedia indication information outputting unit further comprises:

a determining module, configured to determine whether to perform a mixing process on the received multimedia indication information of the call progress state;

a mixing module, configured to mix the multimedia indication information of the call progress state with other conference information when the result of the determination indicates that a mixing process needs to be performed, wherein the mixing module is further configured to mix the multimedia indication information of the call progress state with the other conference information by at least one of: mixing voice indication information of the call progress state with conference voice data or mixing picture or video indication information of the call progress state with the conference video information in a Picture-in-Picture mode; and a sending module, configured to send information that is mixed by the mixing module to at least one of: the management station of conference control device or the conference terminal.

6. The conference control device according to claim 5, wherein the conference control device is a multipoint control unit (MCU).

7. A conference system for indicating a call progress state, comprising:

a conference control device, configured to send a call request, obtain multimedia indication information corresponding to the call request about a call progress state, and send the multimedia indication information of the call progress state; and at least one terminal, configured to receive the call request, and output a corresponding multimedia indication of a progress state according to the multimedia indication information of the call progress state sent by the conference control device;

wherein the conference control device is further configured to:

mix the multimedia indication information of the call progress state with other conference information if it is determined that a mixing process is required for the multimedia indication information of the call progress state, and send mixed information produced by the mixing process, wherein the conference control device is further configured to at least one of: mix voice indication information of the call progress state with conference voice data or mix picture or video indication information of the call progress state with the conference video information in a Picture-in-Picture mode.

8. The conference system according to claim 7, further comprising a management station of conference control device, configured to output a corresponding multimedia indication of a progress state according to the multimedia indication information of the call progress state sent by the conference control device.

9. The conference system according to claim 7, further comprising at least one switch that forms a bearer network of the conference system, wherein the switch is configured to generate multimedia indication information of a call progress state, and send the multimedia indication information of the call progress state to the conference control device.

* * * * *